3,149,530
RIVET PIN AND SLEEVE STRUCTURE
Robert F. Kolec, Whittier, Calif., assignor to Olympic Screw & Rivet Corporation, Downey, Calif., a corporation of California
Filed Sept. 19, 1960, Ser. No. 56,948
2 Claims. (Cl. 85—77)

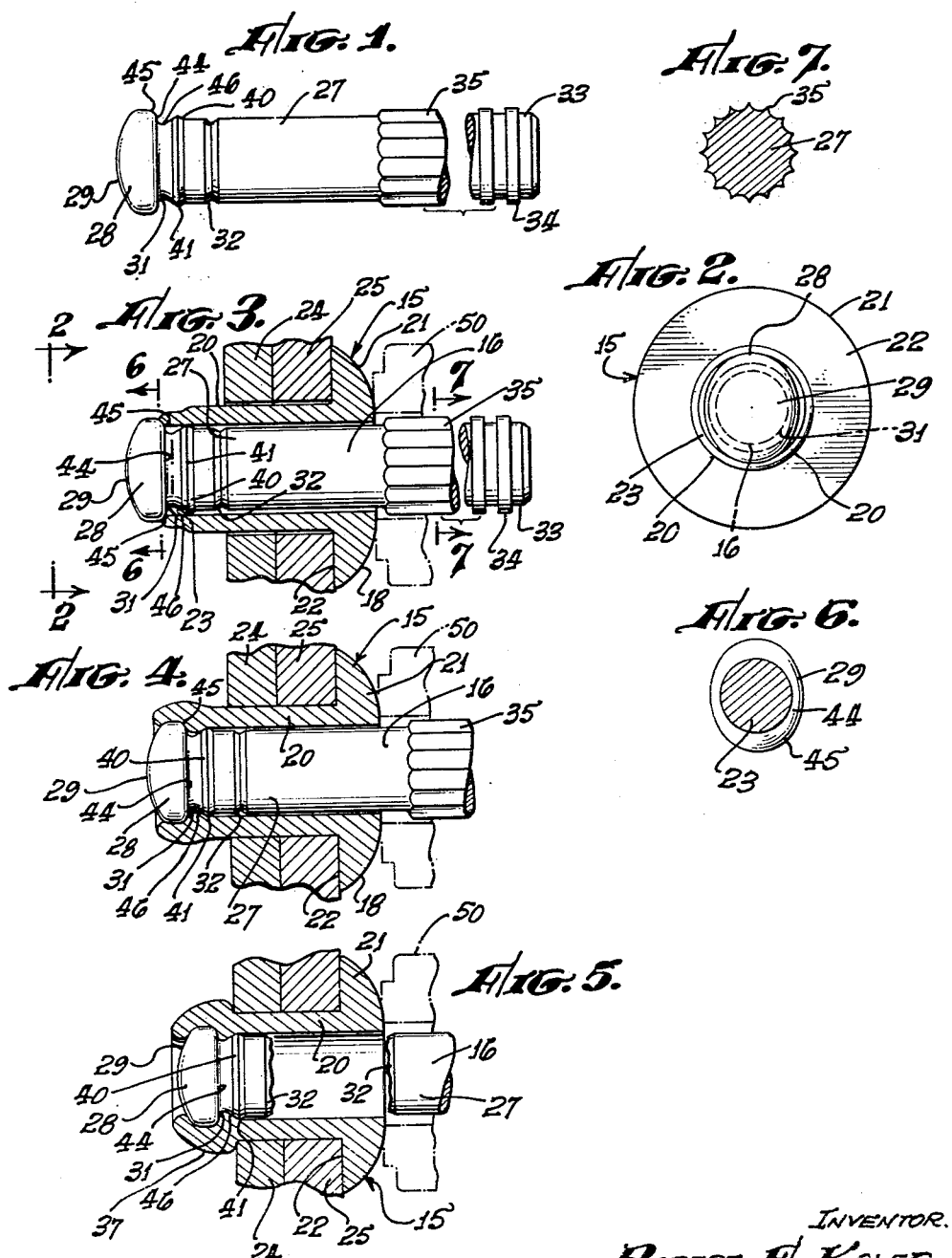

The present invention relates in general to a blind rivet assembly with a primary object of the invention being to provide a blind rivet assembly of a simplified design capable of producing high clinching forces when set.

As general background, a blind rivet assembly of the type to which the invention relates comprises a pin having thereon a tubular rivet which includes a sleeve having a head at one end and a tail at the other end, the pin being provided at one end thereof with rivet expanding means adjacent and engageable with the tail of the tubular rivet and being provided with grippable means at the other end thereof. The pin of this conventional construction is provided with a weakened zone or break neck intermediate its head and the grippable means.

In setting a rivet assembly of the foregoing character, the assembly is inserted through registering holes in elements to be riveted together so that the tail of the tubular rivet and the head on the pin are on the blind or inaccessible side of such elements and the head of the tubular rivet and the grippable means on the pin are on the opposite side thereof. A riveting tool having pressure and pulling members is applied to the rivet assembly with the pressure member seated against the head of the tubular rivet and with the pulling member in engagement with the grippable means on the pin. The pulling member is then moved axially of the pressure member to draw the head on the pin into tail expanding or flaring engagement with the tail of the tubular rivet, thereby clamping the elements which are to be riveted together between the head of the tubular rivet and the expanded or flared tail thereof. Eventually, the pin of this conventional rivet assembly snaps at the break neck therein, upon completion of the setting of the rivet assembly, and any excess portion of the pin may be trimmed off flush with the head of the tubular rivet.

An important object of the present invention is to provide a rivet assembly of the general foregoing nature, wherein the rivet assembly in its fully set condition has the head of the pin drawn into the tail of the tubular rivet, substantially enclosing the head of the pin to provide an enlarged section or bulb which engages the blind side of the assembly of elements being riveted together.

Another object is to provide an improved rivet assembly having a pin with a slightly enlarged head at one end with a peripheral groove immediately adjoining the head and having thereon a tubular rivet which includes a sleeve having a head at one end and a tail at its other end. The wall of the sleeve at the tail has an inside diameter slightly less than the maximum outside dimension of the enlarged pin head and an outside diameter slightly greater than this maximum outside dimension of the pin head. With this construction, as the pin is drawn within the tail of the tubular rivet, metal flows both to fill the groove of the pin and a short distance along the backside of the assembly of elements being riveted, providing a knob or bulb which wedges against the backside of the assembly of elements.

Another object is to provide a pin of improved head design which reduces the tendency of the set rivet assembly to chatter.

Another object is to provide a rivet assembly wherein the pin and tubular rivet component are held together prior to use, in a novel manner.

A still further object is to provide a rivet assembly which when set does not require a trimming of the fractured pin to make it flush with the head of the rivet.

The foregoing objects, advantages, features and results of the present invention, together with various other objects, advantages, features and results which will be evident to those skilled in the blind rivet art in the light of this disclosure, may be achieved with the exemplary embodiment of the invention described in detail hereinafter and illustrated in the accompanying drawings, in which:

FIG. 1 is a fragmentary side elevational view of the pin of the tubular rivet assembly of the invention;

FIG. 2 is an end elevational view of the rivet assembly, taken as indicated by the arrowed line 2—2 of FIG. 3;

FIG. 3 is a longitudinal sectional view, illustrating the first step in the setting of a blind rivet assembly of the invention;

FIG. 4 is a longitudinal sectional view, illustrating the blind rivet assembly in partially set condition;

FIG. 5 is another longitudinal sectional view, illustrating the blind rivet assembly in fully set condition, immediately after breaking of the pin at its weakened zone;

FIG. 6 is a cross-sectional view taken along line 6—6 of FIG. 3 showing the preferred oblong-shaped head of the pin; and FIG. 7 is a cross-sectional view taken along line 7—7 of FIG. 3.

Referring first to FIG. 3 of the drawings, the completed blind rivet assembly 15 of the invention is shown to include a pin 16 having thereon a tubular rivet 18. The latter includes a sleeve 20 and a head 21 at opposite ends thereof. The head 21 is provided with a shoulder 22 which faces a tail 23 at the other end of the tubular rivet sleeve 20.

The pin 16 is provided at one end thereof with means for expanding the tail 23 of the tubular rivet 18. This expanding means comprises a slightly enlarged head 28 carried at the end of an elongated shank 27 of the pin 16. The head 28 presents a generally rounded, outer surface 29. The inner side or shoulder 44 of the head, adjacent the shank 27, is preferably provided with a rounded surface 45 having a short radius of curvature. The outer, rounded surface 29 of the head 28, in contrast, has a considerably larger radius of curvature. The head 28, as best seen in FIGS. 6 and 2, is oblong and has an elliptical cross section. Such a configuration of the head has proven advantageous in that it reduces the tendency of the set rivet assembly to chatter. Occasionally, the head of the pin of a set rivet assembly will vibrate, even though the rivet itself is secured.

The shank 27 of the pin 16 immediately preceding the head 28 decreases in cross section to provide a circumferential locking groove 31. The locking groove 31 preferably has a rounded bottom 46, as illustrated. The shank 27 of the pin 16, immediately adjoining the peripheral groove, carries an annular rib 40 which has a maximum diameter larger than the diameter of the shank proper and less than the maximum outside dimension of the enlarged head 28. The diameter of the rib 40 is only slightly less than that of the diameter of the internal wall of the sleeve 20. The annular rib 40 is formed of two steeply sloping sides which terminate in a sharp edge 41. The rib 40 in having a larger diameter than the shank proper 27, effectively increases the depth of the locking groove 31 which is advantageous in the setting of the rivet.

The shank 27 has along its length, spaced a short distance from the annular rib 40, a weakened zone or break neck 32, preferably in the form of an annular groove with a sharp dividing point at the bottom of the groove. The pin 16 is adapted to snap at this point when the blind rivet assembly 15 is set.

The pin 16 is also provided, at the end opposite the head 28, with grippable means 33 which means are engageable by the pulling member of a riveting tool to be described. The gripping means 33 of the pin may take different forms and in the particular construction illustrated, these means comprise a plurality of annular ribs 34.

The pin 16 is also provided with means for retaining the sleeve 20 on the pin 16 prior to upset, that is, prior to the setting of the rivet assembly. The retaining means may take various forms. In the preferred embodiment illustrated, the pin 16 is provided with a plurality of external, longitudinally-extending, retaining ribs 35 of relatively short length spaced along the length of the pin 16, beginning at a point just beyond the head 21 of the tubular rivet component 18 in the assembled rivet. The several ribs 35 each present a sharp, upper longitudinal edge and have an outside dimension only slightly larger than the inside diameter of the tubular rivet 18 which close dimensioning permits the forcing of the tubular rivet 18 over the pin 16 during the fitting together of the rivet assembly 15. The longitudinally extending ribs 35 act as a retaining means, keeping the tubular rivet mounted on the pin 16. During shipment of the rivet assembly, there is a tendency for the tubular member component 18 to move longitudinally upon the pin 16, but with the inclusion of the longitudinal ribs, disassembly is precluded, in most instances, because of the usual misalignment of the vertical ribs 35 with the slight grooves formed by the sharp ribs on the inside of the sleeve 20 during assembly.

In the setting of the rivet assembly 15, the tail 23 of the tubular rivet sleeve 20 expands over the head 28 of the pin 16 to partially enclose the pin head resulting in a knob or bulb 37 which in its fully set form engages the rear side of a two-piece assembly 24 and 25 which is to be riveted together. The dimensioning of the wall of the tail 23 of the tubular sleeve 20 and its relationship to the pin head 28 are most important in the obtaining of the bulb 37 and its clinching action. The wall of the sleeve at the tail has an inside diameter slightly less than the maximum outside dimension of the enlarged pin head 28. The outside diameter of the wall of the sleeve 20, as best seen in FIG. 3 is somewhat greater than this maximum outside dimension of the pin head 28. With the application of the setting force to the pin 27, this critical dimensioning of the wall of the tail 23 and pin head 28 permits the flow of some of the metal of the tail wall along the rounded, outer surface 29 of the oblong pin head 28 to partially encase it, and simultaneously the extrusion of some metal to fill the groove 31, adjoining the pin head 28. The rounded surface 45 of the shoulder 44 of the pin head 28 facilitates the starting of the sleeve in its enclosing of the pin head 28. This slight rounding of the pin head shoulder 44 also guards against burring and scraping of the sleeve 20 during setting of the rivet assembly 15 which damage could lead to the splitting of the sleeve. The rounded bottom 46 of the locking groove 31 assists in the flow of metal into the groove. With the continued application of the setting force, there is formed the aforementioned bulb 37 which engages the backside of the two members 24 and 25 which are being riveted together. As illustrated in FIG. 3, it is desirable in some instances to reduce slightly the outside dimension of the wall of the sleeve 20 immediately adjacent the tail 23, but even with this reduction in outside diameter, the dimension is still somewhat larger than the maximum outside dimension of the pin head 28.

The setting of the rivet assembly 15 is best understood with reference to FIGS. 3, 4 and 5. The pin 16 and the tubular rivet 18 are assembled in the manner shown in FIG. 3 and as described previously. The resulting blind rivet assembly 15 is inserted into registering holes of the elements 24 and 25 which are to be riveted together. At this time the tail 23 of the tubular rivet 18 and head 28 of the pin 16 are disposed on the blind side of the elements 24 and 25, while the head 21 of the tubular rivet 18 and the grippable means 33 on the pin 16 are disposed on the accessible side of the assembly. A suitable riveting tool 50 (not fully illustrated) is applied to the rivet assembly engaging the gripping means 33 on the pin 16. The pin 16 is moved axially of the tubular rivet 18 to pull the enlarged head 28 into the tail 23 of the sleeve 20, with the result that the enlarged head 28 of the pin 16 expands the tail of the tubular rivet 18 in the fashion illustrated in FIGS. 4 and 5. There is no splitting of the tail of the tubular rivet sleeve 20 but rather a flowing of the metal along the surface of the pin head 28 to partially enclose it. Simultaneously, metal flows into the groove 31. Continued movement of the pin 16 to the right of FIG. 5 moves the resulting bulb 37 into engagement with the backface of the element 24. As shown in FIG. 5, when the pin 16 arrives at its final position, the resistance to further axial movement thereof reaches a value such that the pin snaps at the break neck 33. Since the break neck is placed interiorly of the assembled rivet, there is no need to trim off the jagged break neck flush with the exterior of the rivet as is sometimes necessary in blind rivets of other designs.

Although an exemplary embodiment of the invention has been disclosed herein for purposes of illustration, it will be understood that various changes, modifications and substitutions may be incorporated in such embodiment without departing from the spirit of the invention as defined in the following claims.

I claim as my invention:

1. A rivet assembly comprising a pin having a grippable means at one end connected by a shank to an enlarged head having a rounded peripheral edge at the other end and with a peripheral round-bottomed groove immediately adjacent said rounded peripheral edge of said head and an annular rib on said shank adjoining the edge of said peripheral groove away from the head, one side of the rib forming a continuation of one side of the groove so as to increase the effective depth of the groove, a tubular rivet open at both of its ends and including a sleeve having a head at one end and a tail at the other end, said sleeve head having a shoulder which faces said tail with the wall of the sleeve at the tail having an inside cylindrical surface of a diameter slightly less than the maximum outside dimension of the enlarged pin head and an outside diameter slightly greater than said maximum outside dimension of the pin head, said annular rib having a sharp crest of a diameter larger than the diameter of the shank proper and less than the maximum outside dimension of the enlarged pin head and said peripheral groove before setting of the rivet assembly containing no portion of the tubular rivet and upon setting being substantially filled with an extruded portion of said rivet.

2. A rivet assembly in accordance with claim 1 wherein the wall of the sleeve between the head and the tail has a somewhat larger outside dimension than at the tail with a chamfered section connecting the two sections of the sleeve wall.

References Cited in the file of this patent

UNITED STATES PATENTS

| 1,457,008 | Smith | May 29, 1923 |
| 2,030,166 | Huck | Feb. 11, 1936 |
| 2,384,321 | Lees | Sept. 4, 1945 |
| 2,533,448 | Forman | Dec. 12, 1950 |
| 2,843,861 | Gandy | July 22, 1958 |
| 2,877,682 | Barry | Mar. 17, 1959 |
| 3,042,961 | Tieri | July 10, 1962 |
| 3,047,181 | Heidenwolf | July 31, 1962 |

FOREIGN PATENTS

| 209,142 | Australia | May 25, 1960 |
| 555,416 | Belgium | Mar. 15, 1957 |
| 79,119 | Denmark | Mar. 28, 1955 |